US010437700B2

(12) United States Patent
Robertson et al.

(10) Patent No.: US 10,437,700 B2
(45) Date of Patent: Oct. 8, 2019

(54) TRACING INTERCONNECT CIRCUITRY

(71) Applicant: UltraSoC Technologies Limited, Cambridge (GB)

(72) Inventors: Iain Craig Robertson, Cople (GB); Andrew Brian Thomas Hopkins, Folkestone (GB); Michael Jonathan Thyer, Cambridge (GB)

(73) Assignee: UltraSoC Technologies Limited (GB)

( * ) Notice: Subject to any disclaimer, the term of this patent is extended or adjusted under 35 U.S.C. 154(b) by 162 days.

(21) Appl. No.: 15/241,471

(22) Filed: Aug. 19, 2016

(65) Prior Publication Data
US 2017/0052868 A1 Feb. 23, 2017

(30) Foreign Application Priority Data

Aug. 21, 2015 (GB) .................................. 1514908.1

(51) Int. Cl.
*G06F 11/34* (2006.01)
*G06F 11/30* (2006.01)

(52) U.S. Cl.
CPC ...... *G06F 11/3485* (2013.01); *G06F 11/3041* (2013.01); *G06F 11/349* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,590,354 A * | 12/1996 | Klapproth | ........ | G01R 31/31705 714/30 |
| 6,345,295 B1 | 2/2002 | Beardsley et al. | | |
| 7,058,928 B2 * | 6/2006 | Wygodny | ........... | G06F 11/3636 714/E11.212 |
| 7,080,283 B1 * | 7/2006 | Songer | ................ | G06F 11/3636 714/30 |
| 7,346,809 B2 * | 3/2008 | Blanchard | ........... | G06F 11/1441 714/36 |
| 7,379,860 B1 * | 5/2008 | Bartz | .................. | G06F 11/3636 703/14 |
| 7,519,879 B2 * | 4/2009 | Woodward | ......... | G01R 31/3177 714/37 |
| 7,613,955 B2 * | 11/2009 | Arnold | .................. | G06F 11/366 714/30 |
| 8,312,435 B2 * | 11/2012 | Wygodny | ........... | G06F 11/3636 717/124 |
| 8,612,939 B2 * | 12/2013 | Marenco | ............. | G06F 11/3636 717/128 |

(Continued)

FOREIGN PATENT DOCUMENTS

EP 0520766 11/1997

OTHER PUBLICATIONS

UK Search Report; Application No. GB1514908.1; dated Mar. 30, 2016; 3 pages.

*Primary Examiner* — Amine Riad
(74) *Attorney, Agent, or Firm* — Fish & Richardson P.C.

(57) ABSTRACT

A method of tracing transactions on an integrated circuit chip. The method comprises, for each transaction: extracting the transaction from interconnect circuitry of the integrated circuit chip, the transaction comprising an address signal and a data signal; applying a filtering condition to the address signal; only if the address signal does not fail the filtering condition, storing the address signal in an address trace buffer; storing the data signal in a data trace buffer; applying a triggering condition to the stored transaction; and outputting the stored transaction if the stored transaction matches the triggering condition.

19 Claims, 4 Drawing Sheets

(56) References Cited

U.S. PATENT DOCUMENTS

| | | | | |
|---|---|---|---|---|
| 8,762,783 B2* | 6/2014 | Abrams | ............... | G06F 11/366 |
| | | | | 709/223 |
| 9,021,311 B2* | 4/2015 | Miller | ................... | G06F 11/26 |
| | | | | 714/45 |
| 9,304,881 B2* | 4/2016 | Quennesson | ......... | G06F 11/261 |
| 9,720,036 B2* | 8/2017 | Deutsch | ............... | G06F 11/348 |
| 2004/0153863 A1* | 8/2004 | Klotz | .................. | H04L 41/12 |
| | | | | 714/45 |
| 2004/0250164 A1* | 12/2004 | Ahmad | ................ | G06F 11/364 |
| | | | | 714/30 |
| 2008/0098358 A1* | 4/2008 | Shekov | ............. | G06F 11/3476 |
| | | | | 717/128 |
| 2009/0138763 A1* | 5/2009 | Arnold | ................. | G06F 11/366 |
| | | | | 714/45 |
| 2011/0072418 A1* | 3/2011 | Kalamegham | ...... | G06F 11/3636 |
| | | | | 717/128 |
| 2013/0111073 A1 | 5/2013 | Dobbie et al. | | |
| 2014/0068344 A1 | 3/2014 | Miller | | |
| 2014/0068345 A1* | 3/2014 | Miller | ............... | G06F 11/3636 |
| | | | | 714/45 |
| 2014/0177633 A1* | 6/2014 | Manula | ............... | H04L 43/028 |
| | | | | 370/392 |
| 2016/0142269 A1* | 5/2016 | Konduru | ............. | H04L 43/026 |
| | | | | 709/224 |
| 2018/0300109 A1* | 10/2018 | Bhat | ........................ | G06F 8/41 |
| 2018/0300111 A1* | 10/2018 | Bhat | ........................ | G06F 8/41 |
| 2018/0316629 A1* | 11/2018 | Butcher | ................ | H04L 49/90 |

* cited by examiner

TRACING INTERCONNECT CIRCUITRY

BACKGROUND

This disclosure relates to tracing interconnect circuitry, such as buses, on an integrated circuit chip.

In the past, an embedded system which had multiple core devices (processors, memories etc.) would have been incorporated onto a Printed Circuit Board (PCB) and connected on the PCB via buses. Traffic in the embedded system was conveyed over these buses. This arrangement was convenient for debugging the core devices, because debugging tools such as oscilloscopes and logic analyzers could be attached to the PCB's buses allowing direct access to the core devices.

Market demand for smaller products coupled with advances in semiconductor technology has led to the development of System-on-Chip (SoC) devices. In a SoC, the multiple core devices of an embedded system are integrated onto a single chip. In a SoC, the traffic in the embedded system is conveyed over internal buses, thus connection of debugging tools directly to the system bus is no longer possible. The resulting reduced access coupled with an increasing quantity of data being transported around the chip (due to developments of SoC technology leading to integration of multiple processing cores and higher internal clocking frequencies), has reduced the ability of external debugging tools to find and solve bugs within the system in the timescales demanded by the industry.

Thus, the development of SoC devices required associated development in debugging technology, which lead to the integration of some debug functionality onto the SoC. It is now customary for on-chip debugging circuitry to trace transactions on the internal buses of the SoC. The data rate available for transporting data to an off-chip debug controller, for example via USB, is much lower than the data rate on the internal buses. This coupled with the large quantity of transactions being transported on each bus, makes it impractical to trace every transaction on a bus and transport all of the traced transactions off-chip. Thus, it is customary to filter and/or trigger the transactions that are traced and output to the off-chip debugger.

Typically, a transaction has multiple phases spread over several bus cycles. For example, a transaction may have an address phase and a data phase. The filtering/triggering condition may be such that it is not known in the first phase of a transaction whether the transaction will match the condition. For example, if the condition is a transaction error, this may only become apparent at the end of the transaction. To deal with this, it is known to store all the information relating to each phase of a transaction as it arises, and at the end of the transaction to apply the filter/trigger condition and store the information in the trace buffer only if all the filter/trigger condition is met. This method requires all the information on each pending transaction on a bus to be stored until the transaction has completed and the filtering/triggering condition can be successfully applied. Modern bus systems may concurrently progress 16, 32 or even more transactions, each of which typically has hundreds of data bits to be traced. Thus, this approach requires extensive storage allocation to implement.

SUMMARY OF THE INVENTION

According to a first aspect of this disclosure, there is provided a method of tracing transactions on an integrated circuit chip, the method comprising, for each transaction: extracting the transaction from interconnect circuitry of the integrated circuit chip, the transaction comprising an address signal and a data signal; applying a filtering condition to the address signal; only if the address signal does not fail the filtering condition, storing the address signal in an address trace buffer; storing the data signal in a data trace buffer; applying a triggering condition to the stored transaction; and outputting the stored transaction if the stored transaction matches the triggering condition.

The transaction may further comprise a response signal, and the method may further comprise storing the response signal in a response trace buffer.

Following extracting the transaction from the interconnect circuitry, if the address signal fails the filtering condition, the address signal may be discarded. Following extracting the transaction from the interconnect circuitry, if the address signal fails the filtering condition, the transaction may be discarded.

If the stored transaction matches the triggering condition, all contents of the address trace buffer and data trace buffer may be outputted. If the stored transaction does not match the triggering condition, the stored transaction may be retained in the trace buffers.

Upon becoming full, the address trace buffer may be overwritten. Upon becoming full, the data trace buffer may be overwritten. Upon becoming full, the response trace buffer may be overwritten.

Suitably, the method further comprises: applying the filtering condition to the data signal; and only if the data signal does not fail the filtering condition, storing the data signal in the data trace buffer. If the data signal fails the filtering condition, all constituents of the transaction not already stored may be discarded.

Suitably, the method further comprises: applying the filtering condition to the response signal; and only if the response signal does not fail the filtering condition, storing the response signal in the response trace buffer.

The method may further comprise: allocating a tracker identity in association with the address signal; and allocating the tracker identity in association with the data signal.

Suitably, the method comprises, following outputting the stored transaction, reassembling the transaction by aggregating the address signal and data signal stored in association with the same tracker identity.

The transactions may be communicated according to a protocol in which a data signal of a transaction is permitted to precede the address signal of the transaction by a time T, and the method may further comprise after extracting the transaction from the interconnect circuitry, pre-buffering the data signal prior to storing the data signal in the data trace buffer for at least the time T.

The pre-buffered data signal may only be outputted to the data trace buffer if the address signal of the transaction did not fail the address filtering condition.

The pre-buffered data signal may be discarded if the address signal of the transaction fails the address filtering condition.

A timestamp may be applied to the address signal on the address signal entering the address trace buffer. A timestamp may be applied to the data signal on the data signal entering the data trace buffer. A timestamp may be applied to the response signal on the response signal entering the response trace buffer.

Suitably, the interconnect circuitry is a bus.

The triggering condition may be a transaction error. The triggering condition may be a specific address signal. The triggering condition may be a transaction in a specific address range.

According to a second aspect of this disclosure, there is provided an integrated circuit chip comprising: system circuitry comprising interconnect circuitry for transporting transactions, each transaction comprising an address signal and a data signal; and debugging circuitry comprising an address trace buffer and a data trace buffer, the debugging circuitry being configured to: extract a transaction from the interconnect circuitry; apply an address filtering condition to the address signal; only if the address signal does not fail the address filtering condition, store the address signal in the address trace buffer; store the data signal in the data trace buffer; apply a triggering condition to the stored transaction; and output the stored transaction if the stored transaction matches the triggering condition.

Suitably, the address trace buffer and the data trace buffer are each at least as long as the maximum number of concurrent transactions on the interconnect circuitry.

BRIEF DESCRIPTION OF THE DRAWINGS

The present disclosure will now be described by way of example with reference to the accompanying drawings. In the drawings.

DETAILED DESCRIPTION

The following disclosure describes a debug architecture suitable for implementation on a SoC or an MCM.

Figure 1:
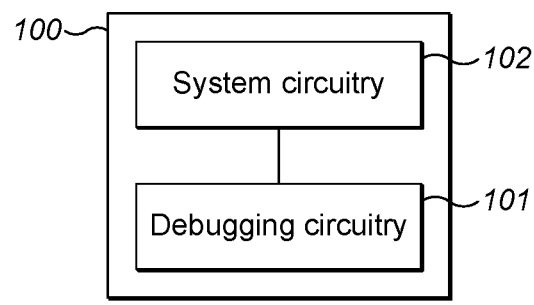
FIG. 1 is a schematic drawing of an exemplary debug architecture on an integrated circuit chip device.
Figure 2:
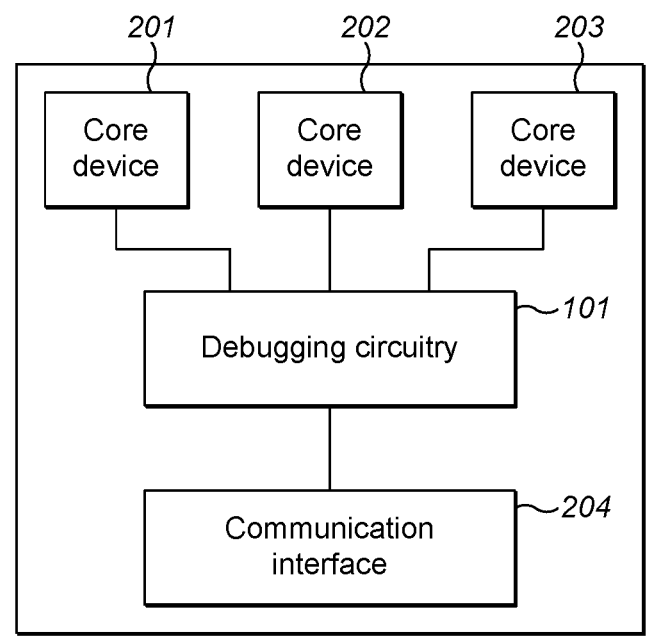
FIG. 2 is a schematic drawing of an exemplary debug architecture on an integrated circuit chip device.
Figure 3:
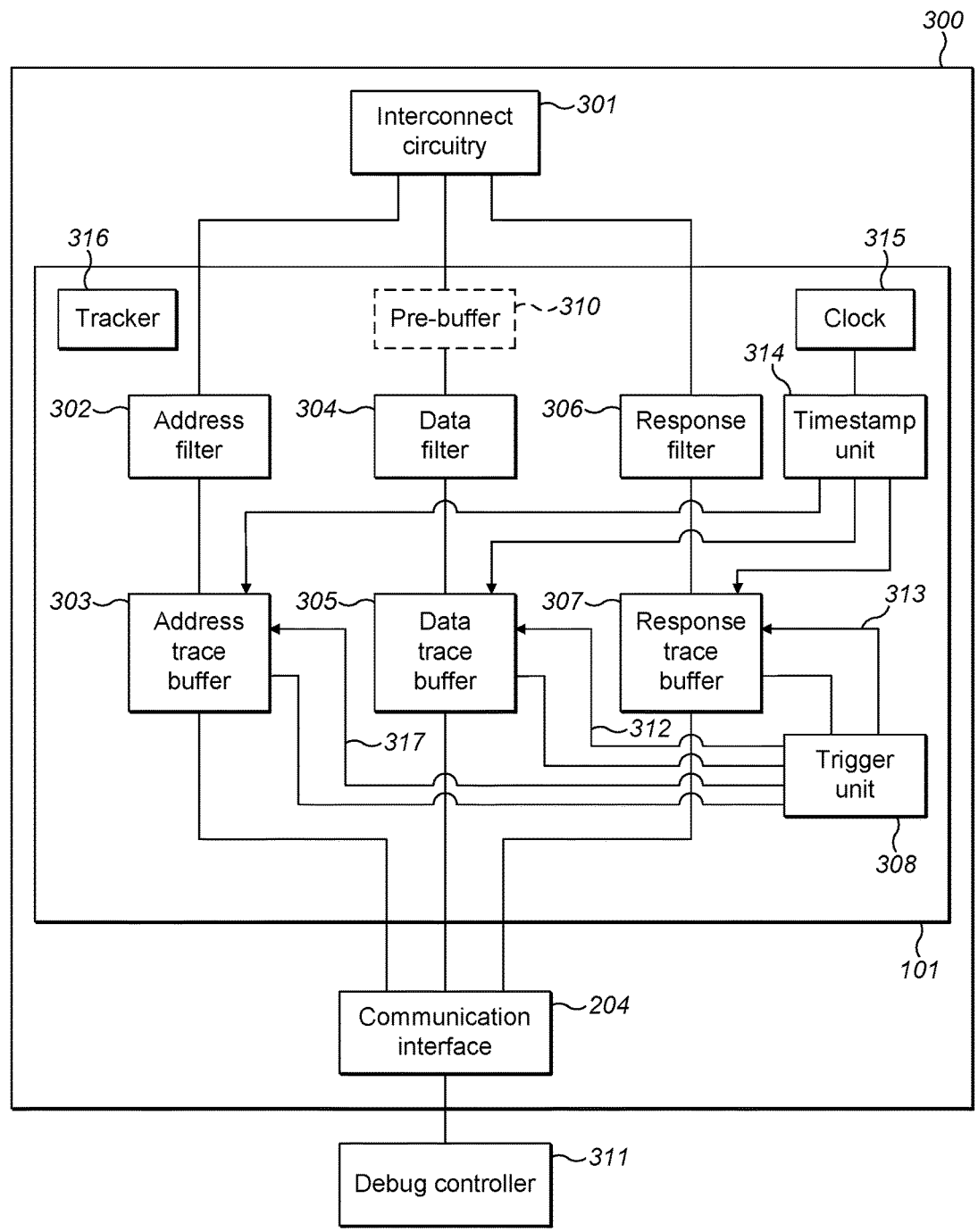
FIG. 3 is a schematic drawing of an exemplary debug architecture for tracing interconnect circuitry.
Figure 4:
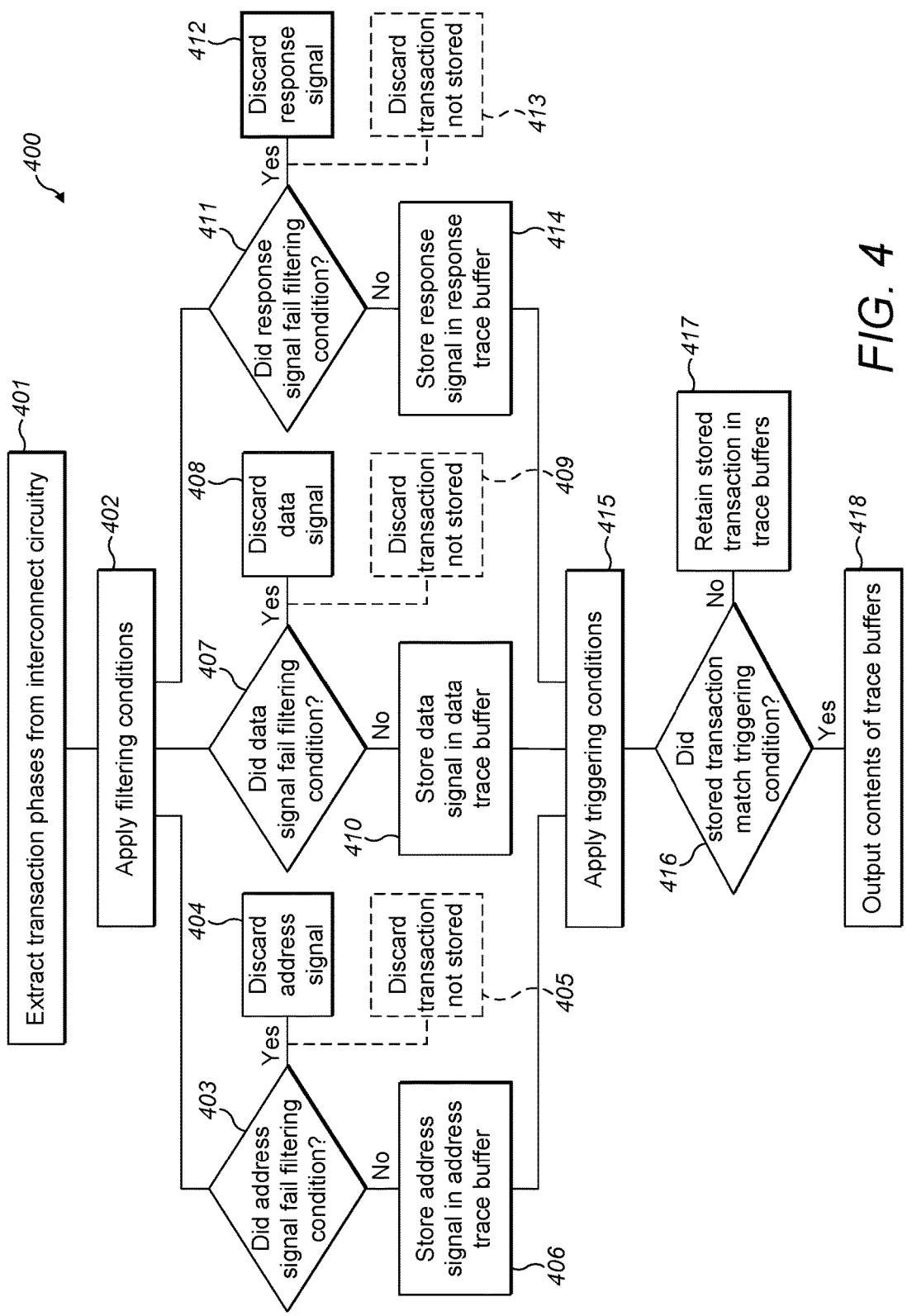
FIG. 4 illustrates a method of tracing transactions of interconnect circuitry.
Figure 5:
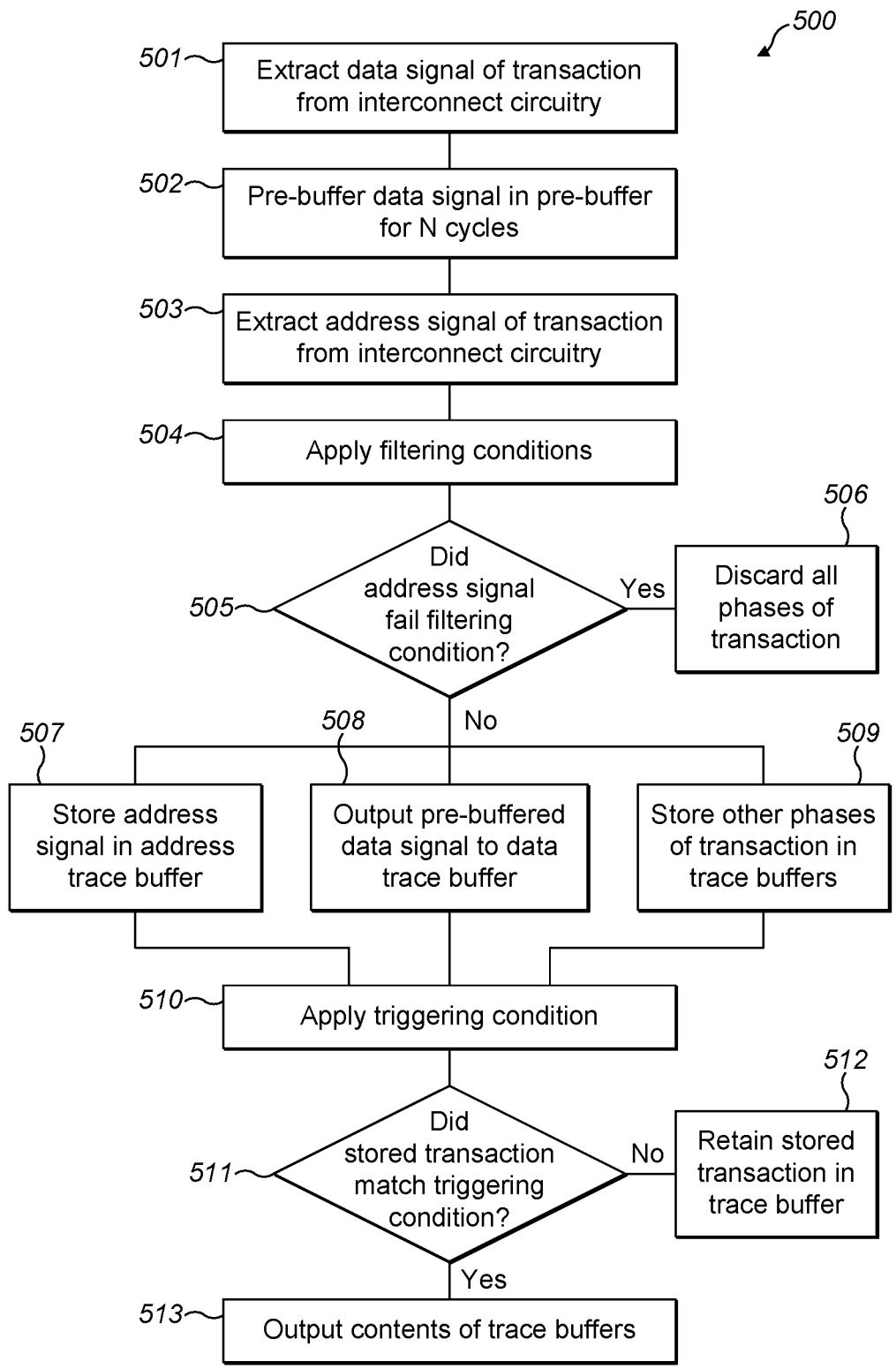
FIG. 5 illustrates a further method of tracing transactions of interconnect circuitry.

FIGS. 1 to 3 are schematic diagrams of exemplary debug architectures, and components within debug architectures. These figures present the structures in terms of functional blocks. Some functional blocks for carrying out functions well known in the art have in places been omitted from these figures. FIGS. 4 and 5 are flowcharts illustrating methods of tracing transactions of interconnect circuitry. Each flowchart depicts an order in which the method of that flowchart can be performed. However, the flowcharts are not intended to restrict the described methods to being implemented in the orders depicted. The steps of the methods may be carried out in alternative orders to those depicted in the flowcharts.

FIG. 1 illustrates the general structure of an exemplary debug architecture for a SoC 100. Debugging circuitry 101 is arranged to debug system circuitry 102. FIG. 2 illustrates exemplary system circuitry comprising core devices and a communication interface. Core devices 201, 202 and 203 of the SoC are each connected to debugging circuitry 101. Although FIG. 2 illustrates three core devices, any number of core devices can be suitably integrated into the debug architecture. Exemplary core devices include a DSP (digital signal processor), video processor, applications processor or CPU (central processor unit), graphics processor, system memory, bus, system interconnect, RTOS (real-time operating system), software, data, custom circuit and a data engine. However, any component of a SoC is suitable for being incorporated into the debug architecture as a core device on FIG. 2. The core devices may be emulators or simulators of other devices on the chip. For example, a core device may emulate a processor.

The debugging circuitry is able to manipulate the operation of the core devices and monitor the operation of the core devices. The debugging circuitry is connected to a communication interface 204. Communication interface 204 may be configured to communicate with entities off-chip. For example, debugging circuitry 101 may communicate with an off-chip debug controller via communication interface 204. Communication interface 204 may also be configured to communicate with other entities on-chip. For example, debugging circuitry 101 may communicate with an on-chip debug controller via communication interface 204. Although FIG. 2 illustrates one communication interface, any number of communication interfaces can be integrated onto the SoC. The communication interfaces implemented are chosen in dependence on the type of connections that are to be made. Exemplary communication interfaces include: traditional debug interfaces such as JTAG, parallel trace input/output, and Aurora based high-speed serial interface; and reuse of system interfaces such as USB, Ethernet, RS232, PCIe and CAN.

The following description focuses on examples in which a core device of FIG. 2 is interconnect circuitry, and the debugging circuitry 101 traces the interconnect circuitry. The interconnect circuitry transports messages between components of the SoC. The interconnect circuitry may, for example, be a system bus.

Data is transported on the interconnect circuitry as transactions in accordance with the interconnect circuitry's communication protocol. A transaction does not occur at one point in time, but is partitioned into multiple phases which are spread over several cycles of the interconnect circuitry's protocol. Each transaction may have two phases, for example consisting of an address phase and a data phase. Each transaction may have three phases, for example consisting of an address phase, a data phase, and a response phase. Each transaction may have more than three phases. The transaction phases are decoupled from each other.

The debugging circuitry traces the interconnect circuitry by recording the transactions on the interconnect circuitry. Suitably, the debugging circuitry traces the interconnect circuitry whilst the interconnect circuitry continues operating under normal conditions. In the example of a system bus, each transaction phase has a set of dedicated wires on the bus. For each phase, the source asserts a "valid" signal for that phase along with all the other signals for that phase, and holds them at the same value until the sink asserts a "ready" signal. Each phase consists of a single cycle on the bus wire if the sink asserts the "ready" signal immediately. Suitably, the debugging circuitry records a transaction by recording the signal state of each phase of the transaction. The signal state of each phase of the transaction may require many bits to convey, more so for the data phase than the other phases.

A method will now be described by which the debugging circuitry traces transactions on the interconnect circuitry, with reference to the debugging architecture illustrated on FIG. 3 and the flowchart of FIG. 4.

Interconnect circuitry 301 concurrently processes several transactions. Debugging circuitry 101 is configured to trace the interconnect circuitry 301. Debugging circuitry does not output data concerning every transaction on the interconnect circuitry 301. Debugging circuitry 101 receives a configuration from debug controller 311. The configuration sets the parameters of one or more internal filters and trigger units of the debugging circuitry. Debugging circuitry 101 only outputs trace data on those transactions which meet the filtering and triggering conditions of the debugging circuitry.

At step 401, the debugging circuitry extracts a transaction from the interconnect circuitry. The debugging circuitry extracts each phase of the transaction from the interconnect circuitry individually. This process occurs over several cycles of the interconnect circuitry since the phases of the transaction are separated over time. Typically, the first phase is the address phase in which the address signal is extracted, followed by the data phase in which the data signal is extracted, and finally the response phase (if there is one) in which the response signal is extracted.

At step 402, the filtering conditions of the debugging circuitry are applied to the extracted transaction. The filtering conditions may only apply to one of the phases of the transaction. For example, the filtering conditions may be a specific address range. Alternatively, the filtering conditions may apply to two, more or all the phases of the transaction. The debugging circuitry comprises filters for each of the phases of the transaction. The filtering condition is applied to the address signal at the address filter 302. The filtering condition is applied to the data signal at the data filter 304. The filtering condition is applied to the response signal at the response filter 306. The filtering condition may be applied to all phases of the transaction. The filtering condition may only be applied to the phase of the transaction which could fail the filtering condition. For example, in the case that the filter condition is a specific address range, the debugging circuitry may only apply the filtering condition to the address signal. In this case, if the address signal passes the filtering condition, then all of the transaction is treated as having passed the filtering condition. If the address signal fails the filtering condition, then all of the transaction is treated as having failed the filtering condition.

At step 403, the debugging circuitry determines whether the address signal has failed the filtering condition. For example, if the filtering condition is a specific address range, and the address of the address signal is not within the specific address range, then the address signal has failed the filtering condition. If the address signal has failed the filtering condition, then the address signal is discarded (404). If the address signal has failed the filtering condition, then the debugging circuitry may discard all of the remainder of the transaction of which the address signal was a part (405). In other words, the debugging circuitry may also discard the data signal and the response signal (if there is one) of that transaction. If the debugging circuitry determines that the address signal has not failed the filtering condition, then it stores the address signal in the address trace buffer 303 (step 406).

In the case that the filtering condition applies to multiple phases of the transaction, or applies to a latter phase of the transaction, the debugging circuitry is unable to resolve the filtering condition on filtering the first phase of the transaction. Thus, as long as the address signal does not fail the filtering condition, the address signal is stored.

At step 407, the debugging circuitry determines whether the data signal has failed the filtering condition. For example, if the filtering condition is a specific data value, and that data value is not in the data signal, then the data signal has failed the filtering condition. If the data signal has failed the filtering condition, then the data signal is discarded (408). If the data signal has failed the filtering condition, then the debugging circuitry may discard all of the remainder of the transaction of which the data signal was a part (409). This may be limited to discarding all the remainder of the transaction that has not already been stored in a trace buffer. If the debugging circuitry determines that the data signal has not failed the filtering condition, then it stores the data signal in the data trace buffer 305 (step 410).

At step 411, the debugging circuitry determines whether the response signal has failed the filtering condition. If the response signal has failed the filtering condition, then the response signal is discarded (412). If the response signal has failed the filtering condition, then the debugging circuitry may discard all of the remainder of the transaction of which the response signal was a part (413). This may be limited to discarding all the remainder of the transaction that has not already been stored in a trace buffer. If the debugging circuitry determines that the response signal has not failed the filtering condition, then it stores the response signal in the response trace buffer 307 (step 414).

Trigger unit 308 has one or more triggering conditions which have been set by the configuration sent from the debug controller. At step 415, the debugging circuitry applies the trigger condition to the stored transactions in the trace buffers. The debugging circuitry determines if one of the stored transactions in the trace buffers matches the triggering condition (step 416). If the debugging circuitry determines that the stored transactions in the trace buffers do not match the triggering condition, then those stored transactions are retained in the trace buffers (step 417) and no action is taken to empty the trace buffers. If the debugging circuitry determines that the stored transactions in the trace buffers do match the triggering condition, then the debugging circuitry outputs the trace data from the trace buffers (step 418). Suitably, the debugging circuitry outputs all the contents of all of the trace buffers on determining that the trigger condition has been matched. For example, the trigger unit may send control signals 317, 312, 313 to the trace buffers to control them to output all their contents immediately.

Suitably, the triggering condition is continuously applied. As soon as all the criteria of the triggering condition are satisfied, the buffers are triggered. The buffer for the transaction phase on which the final trigger criteria matched, and the buffers of any already completed transaction phases, are all output immediately. The buffers of any outstanding transaction phases are output as soon as that phase of the triggering transaction occurs.

The output of each trace buffer is sent as trace data to the debug controller 311. The output of each buffer indicates the buffer that output it. Thus, the debug controller 311 is able to reconstruct the whole of a transaction from the received trace data.

Alternatively, the debugging circuitry may reassemble transactions from the transaction phases output by the trace buffers at an assembler prior to outputting the transactions as trace data to the debug controller 311.

The following describes an example in which the debugging circuitry has been configured by the debug controller to trace transactions of the interconnect circuitry which terminate with an error. Typically, whether or not a transaction comprises an error is not apparent until the end of the transaction. The debugging circuitry extracts the transaction from the interconnect circuitry, and applies the filtering conditions. The address signal and the data signal do not fail the filtering conditions, thus both of these are stored in the address trace buffer and data trace buffer respectively. The error occurs in the response phase. In this case, the filtering condition and the triggering condition are both the same which is an error. The response signal matches the filtering condition and the triggering condition. This results in all the contents of the trace buffers being triggered to be output, and exported to the debug controller. The address of the error transaction will be somewhere in the address trace buffer output. The data of the error transaction will be somewhere in the data trace buffer output. The response containing the error will be the newest entry to the response trace buffer. All three phases of the error transaction are therefore output and sent to the debug controller.

Each of the trace buffers 303, 305, 307 overwrites the oldest entry in the buffer with the newest entry upon becoming full. For example, the trace buffers may be circular buffers. Each of the trace buffers 303, 305, 307 is at least as long as the maximum number of concurrently ongoing transactions on the interconnect circuitry. So, for example, if the interconnect circuitry is capable of processing 32 transactions simultaneously, then each of the trace buffers is configured to be able to store at least 32 sets of signals for its associated transaction phase. This ensures that all the phases of a single transaction which has not failed the filtering condition will be stored in their respective trace buffers at a point in time. Thus, if the final phase of a transaction causes the trigger condition to be matched, and hence the trace buffers to be output, each phase of that transaction will be output from the respective trace buffers.

The debugging circuitry may comprise a transaction tracker 316. Transaction tracker comprises M trackers, where M is the number of concurrently active transactions supported by the interconnect circuitry. Transaction tracker 316 tracks transactions through the debugging circuitry. Each tracker has a tracker identity. Suitably the tracker identity is an index number. Transaction tracker 316 allocates a tracker, and hence a tracker identity, to each transaction. A tracker is only allocated to one transaction at any one time. The tracker is associated with each phase of the transaction. The tracker identity is incorporated into the trace data sent to the debug controller. The debug controller reassembles the whole transaction by aggregating those transaction phases associated with the same tracker identity. Once a transaction has completed, the transaction tracker is released and reusable for another transaction extracted from the interconnect circuitry.

The debugging unit may also comprise a timestamp unit 314 configured to apply a timestamp to the address signal on the address signal entering the address trace buffer. Similarly, the timestamp unit applies a timestamp to the data signal on the data signal entering the data trace buffer. Similarly, the timestamp unit applies a timestamp to the response signal on the response signal entering the response trace buffer. The timestamp unit allocates the current time to the timestamp according to the debugging circuitry clock 315. The debugging circuitry clocking frequency may be significantly lower than the interconnect circuitry clocking frequency. In this case, the timestamp may comprise both the current time according to the debugging circuitry clock 315 and an additional precise time field according to the interconnect circuitry clock. The number of bits in the precise time field is suitably configurable and depends on the difference in clock speeds of the debugging circuitry clock 315 and the interconnect circuitry clock. For example, if the interconnect circuitry clock frequency is between 1 and 2 times the debugging circuitry clock frequency, then the precise time field has 3 bits. If the interconnect circuitry clock frequency is between 2 and 4 times the debugging circuitry clock frequency, then the precise time field has 4 bits. If the interconnect circuitry clock frequency is between 4 and 8 times the debugging circuitry clock frequency, then the precise time field has 5 bits. The debugging circuitry outputs the timestamp data of each transaction phase along with the trace data to the debug controller. Thus, the debug controller is able to determine and analyse the temporal relationships between the phases of those transactions which meet the filtering and triggering conditions. The debug controller can determine the time of the transaction to the accuracy of the debugging circuitry clock using the current time portion of the timestamp. The debug controller can determine the time between transaction phases to the accuracy of the interconnect circuitry clock from the precise time field portion of the timestamp.

In some systems, the order in which a transaction progresses through the interconnect circuitry is not fixed. The phases of a transaction may not start in order. For example, the data phase may start progressing on the interconnect circuitry before the address phase. The phases of a transaction may start in order, but finish in a different order. For example, the address phase may start progressing on the interconnect circuitry before the data phase, but the data phase finish progressing (and hence be extracted by the debugging circuitry) prior to the address phase. In the case of the interconnect circuitry being a bus system, a bus field including a transaction ID may be present during all the phases of a transaction. This transaction ID may identify the bus master that the transaction came from. By filtering each phase based on transaction ID, the phases of a transaction can be associated with each other, and hence the order in which the transaction phases are extracted by the debugging circuitry is not important. However inefficiencies arise if the transaction ID is not present in at least one phase of the transaction and that phase is extracted first by the debugging circuitry. For example, if the data phase without a transaction ID is extracted by the debugging circuitry before the address phase which has a transaction ID, but the filtering condition is transactions to a specific address range and from a particular bus master, then the data will already be stored by the debugging circuitry before it has been determined that the address phase has failed the filtering condition. Thus, this could result in huge quantities of data being stored unnecessarily.

FIG. 5 illustrates a method which solves this problem by the debugging circuitry comprising a pre-buffer 310 to temporarily store data phase signals arriving before their associated address phase signals, thereby enabling the filtering condition to be applied to the address signal prior to storing the data signal in the data trace buffer. Suitably, the pre-buffer stores data signals only. Suitably, the number of cycles of the interconnect circuitry by which the data signal of a transaction can precede the address signal of the same transaction has a deterministic maximum which is specific and known to the protocol of the interconnect circuitry. This maximum number of cycles is predetermined according to the protocol of the interconnect circuitry. This maximum number of cycles is referred to herein as N cycles. Typically N≤4. N cycles equates to a period of time T.

At step 501, the debugging circuitry extracts the data phase of a transaction from the interconnect circuitry. At step 502, the debugging circuitry pre-buffers the data signal in pre-buffer 310. The debugging circuitry pre-buffers the data signal for N cycles. The pre-buffer is sufficiently long to buffer the data signal for N cycles. This thereby ensures that the address phase of the transaction has been extracted from the interconnect circuitry prior to the data signal reaching the end of the pre-buffer.

At step 503, the address phase of the transaction is extracted from the interconnect circuitry. At step 504, the filtering conditions of the debugging circuitry are applied to the extracted transaction. FIG. 5 illustrates a situation in which the filtering condition is an address or range of addresses (such as a specific destination address or range of addresses, or a particular bus master address), and hence only applicable to the address signal. In other words, this information is only present in the address phase of the transaction. Thus, in this case, the filtering condition is only applied to the address signal. However, if the filtering condition applied to other phases of the transaction, then the debugging circuitry would also apply the filtering condition to those other phases of the transaction at step 504.

At step 505, the debugging circuitry determines whether the address signal has failed the filtering condition. If the address signal has failed the filtering condition, then all phases of the transaction are discarded at step 506. This includes the address signal and also the data signal stored in the pre-buffer. If the debugging circuitry determines that the address signal has not failed the filtering condition, then at step 507, 508, 509 the debugging circuitry stores all phases of the transaction in the trace buffers. In other words, the debugging circuitry stores the address signal in the address trace buffer 303, the data signal in the data trace buffer 305, and the response signal (if there is one) in the response trace buffer 307. Thus, only if the address signal does not fail the filtering condition, is the data signal of the same transaction output from pre-buffer 310 into data trace buffer 305.

The debugging circuitry then applies the triggering condition at step 310 as described with reference to FIG. 4, step 415. If the stored transaction matches the triggering condition, then the content of the trace buffers is output at step 513 as described with reference to FIG. 4, step 418. If the stored transaction does not match the triggering condition, then the stored transaction is retained in the trace buffers at step 512 as described with reference to FIG. 4, step 417. The triggering condition may also be a transaction addressed to an address in a specific address range, or from a particular bus master. In this case, once the final phase of the transaction is buffered, the buffers are triggered to be output. The whole transaction is then re-assembled at the debug controller.

The methods described herein enable the debugging circuitry to trace transactions on the interconnect circuitry without having to accumulate all the data about an ongoing transaction until it has completed before assessing whether or not the transaction fulfils the filtering/triggering conditions and hence whether it should be forwarded to a trace buffer. Thus, the methods described herein utilise less on-chip storage space than in the described known methods.

Each component of the SoCs illustrated in FIGS. 1 to 3 may be implemented in dedicated hardware. Alternatively, each component of the SoC illustrated in FIGS. 1 to 3 may be implemented in software. Some components may be implemented in software, whilst other components are implemented in dedicated hardware.

Suitably, debugging circuitry 101 including any debug units and communication interfaces are hardware circuits forming part of SoC 100. Preferably, debug units for controlling and/or monitoring complex core devices and peripherals such as processors use suitably complex state machines as part of their control unit. Suitably, communication interfaces use suitably complex state machines to implement their complex protocols. Various approaches to realising state machines are known. Such state machines can be realised using: (i) only logic gates; (ii) a combination of logic gates and memory, where the memory is used to contain tables of values to simplify the state machine's operation or to make it programmable; or (iii) a processor core to execute software stored in memory. Where a processor core is used it can be: (i) integral to the specific debug unit, communication interface, or other debugging circuitry; or (ii) shared between several debug units to reduce their implementation resources and cost.

The SoC described is suitably incorporated within a computing-based device. The computing-based device may be an electronic device. Suitably, the computing-based device comprises one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein. For example, the debugging circuitry may comprise filtering logic to apply the filtering conditions to the transaction phases, and triggering logic to apply the triggering conditions to the stored transactions in accordance with the methods described with reference to FIGS. 4 and 5.

The above description describes the system circuitry and debugging circuitry as being comprised on the same SoC. In an alternative implementation, the system circuitry and debugging circuitry are comprised across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the debugging circuitry may be distributed across more than one integrated circuit chip of the MCM. Thus, the method and apparatus described above in the context of an SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of tracing transactions on an integrated circuit chip, the method comprising, for each transaction:
   extracting the transaction from interconnect circuitry of the integrated circuit chip, the transaction comprising an address signal and a data signal;
   applying a filtering condition to the extracted transaction, wherein the filtering condition applies at least to the address signal of the transaction;
   only if the transaction passes the applied filtering condition:
      storing the extracted transaction by storing each signal of that extracted transaction in a corresponding buffer, wherein the address signal is stored in an address trace buffer and the data signal is stored in a data trace buffer;

subsequently applying a triggering condition to that same stored transaction that has passed the applied filtering condition; and outputting the stored transaction if the stored transaction matches the triggering condition and if the stored transaction does not match the triggering condition, retaining the stored transaction in the trace buffers.

2. A method as claimed in claim 1, wherein the transaction further comprises a response signal, the method further comprising storing the response signal in a response trace buffer as part of storing the transaction.

3. A method as claimed in claim 2, comprising:
upon becoming full, overwriting the address trace buffer, upon becoming full, overwriting the data trace buffer, and upon becoming full, overwriting the response trace buffer.

4. A method as claimed in claim 2, further comprising:
applying the filtering condition to the response signal; and
storing the response signal in the response trace buffer only if the response signal does not fail the filtering condition.

5. A method as claimed in claim 2, comprising:
applying a timestamp to the address signal on the address signal entering the address trace buffer,
applying a timestamp to the data signal on the data signal entering the data trace buffer, and
applying a timestamp to the response signal on the response signal entering the response trace buffer.

6. A method as claimed in claim 1, comprising, following extracting the transaction from the interconnect circuitry, if the address signal fails the filtering condition, discarding the address signal.

7. A method as claimed in claim 1, comprising, following extracting the transaction from the interconnect circuitry, if the address signal fails the filtering condition, discarding the transaction.

8. A method as claimed in claim 1, comprising, if the stored transaction matches the triggering condition, outputting all contents of the address trace buffer and data trace buffer.

9. A method as claimed in claim 1, further comprising:
applying the filtering condition to the data signal; and
storing the data signal in the data trace buffer only if the data signal does not fail the filtering condition.

10. A method as claimed in claim 9, comprising, if the data signal fails the filtering condition, discarding all constituents of the transaction not already stored.

11. A method as claimed in claim 1, further comprising:
allocating a tracker identity in association with the address signal; and
allocating the tracker identity in association with the data signal.

12. A method as claimed in claim 11, comprising following outputting the stored transaction, reassembling the transaction by aggregating the address signal and data signal stored in association with the same tracker identity.

13. A method as claimed in claim 1, wherein the transactions are communicated according to a protocol in which a data signal of a transaction is permitted to precede the address signal of the transaction by a time T, the method further comprising after extracting the transaction from the interconnect circuitry, pre-buffering the data signal prior to storing the data signal in the data trace buffer for at least the time T.

14. A method as claimed in claim 13, further comprising only outputting the pre-buffered data signal to the data trace buffer if the address signal of the transaction did not fail the address filtering condition.

15. A method as claimed in claim 13, comprising discarding the pre-buffered data signal if the address signal of the transaction fails the address filtering condition.

16. A method as claimed in claim 1, wherein the triggering condition is a transaction error, a specific address signal, or a transaction in a specific address range.

17. An integrated circuit chip comprising:
system circuitry comprising interconnect circuitry configured to transport transactions, each transaction comprising an address signal and a data signal; and
debugging circuitry comprising an address trace buffer and a data trace buffer, the debugging circuitry being configured to:
extract a transaction from the interconnect circuitry;
apply a filtering condition to the extracted transaction, wherein the filtering condition applies at least to the address signal of the transaction;
only if the transaction passes the applied filtering condition:
store the extracted transaction by storing each signal of that extracted transaction in a corresponding buffer, wherein the debugging circuitry is configured to store the address signal in the address trace buffer and store the data signal in the data trace buffer;
subsequently apply a triggering condition to that same stored transaction that has passed the applied filtering condition; and
output the stored transaction if the stored transaction matches the triggering condition and retain the stored transaction in the trace buffers if the stored transaction does not match the triggering condition.

18. An integrated circuit chip as claimed in claim 17, wherein the address trace buffer and the data trace buffer are each at least as long as the maximum number of concurrent transactions on the interconnect circuitry.

19. An integrated circuit chip as claimed in claim 17, wherein the interconnect circuitry is a bus.

* * * * *